United States Patent [19]
Nagashima

[11] Patent Number: 5,947,866
[45] Date of Patent: Sep. 7, 1999

[54] BRAKING DEVICE FOR POWER WORKING MACHINE

[75] Inventor: Akira Nagashima, Kanagawa, Japan

[73] Assignee: Kioritz Corporation, Tokyo, Japan

[21] Appl. No.: 09/074,329

[22] Filed: May 7, 1998

[30]     Foreign Application Priority Data

May 16, 1997 [JP] Japan ..................................... 9-127535

[51] Int. Cl.⁶ ........................... B60K 41/20; F16D 49/00; F16D 65/04
[52] U.S. Cl. ....................... 477/200; 56/11.3; 188/77 W; 192/17 R; 477/173
[58] Field of Search .................................... 477/173, 185, 477/199, 200, 209; 192/17 R; 188/77 W, 339, 77 R; 56/11.3

[56]              References Cited

U.S. PATENT DOCUMENTS

| 2,068,776 | 1/1937 | Syrovy .................................. 188/77 R |
| 3,125,003 | 3/1964 | Gorshkoff ......................... 188/77 R X |
| 3,290,871 | 12/1966 | Haas .......................................... 56/23.4 |
| 4,035,994 | 7/1977 | Hoff ..................................... 477/173 X |
| 4,290,256 | 9/1981 | Seifert .............................. 192/17 R X |
| 4,793,064 | 12/1988 | Nagashima ................................ 30/382 |

FOREIGN PATENT DOCUMENTS 58-54641 12/1983 Japan .
61-54365 11/1986 Japan .

*Primary Examiner*—Charles A. Marmor
*Assistant Examiner*—Sherry Lynn Estremsky
*Attorney, Agent, or Firm*—Baker & Botts, L.L.P.

[57]              ABSTRACT

A braking device for a power working machine, which is capable of immediately stopping the movement of the working portion when an internal combustion engine is shifted to an idling state, includes a transmission shaft, a brake drum fixed to the transmission shaft, and a brake band wound around the brake drum. The brake band is formed of a leaf spring material band, which is biased to shrink the diameter thereof, one end of which is pivotally supported on a supporting pin, and the other end of which is formed into a bent free end.

10 Claims, 4 Drawing Sheets

BRAKING DEVICE FOR POWER WORKING MACHINE

BACKGROUND OF THE INVENTION

This invention relates to a braking device for a power working machine, and in particular to a braking device for braking the revolving power transmission portion of a working portion during the idling of an internal combustion engine for a portable type power working machine, such as a hedge trimmer.

A portable type power working machine such as a hedge trimmer is generally constituted by a prime mover case having a prime mover such as an internal combustion engine or an electric motor therein, amount base portion enclosing a transmission case having a power transmission device such as a centrifugal clutch and gears to be actuated by the prime mover, a working portion comprising clipper blades to be actuated via the aforementioned power transmission device by the prime mover, and a handling portion attached to the prime mover case or the mount base portion. The handling portion is constituted, for the convenience of manipulation thereof, by a front handle portion and a rear handle portion. The rear handle portion is provided with a throttle lever for adjusting the opening degree of a throttle valve where the internal combustion engine is to be employed as a prime mover.

In the use of such a portable type power working machine, both the front handle portion and the rear handle portion are grasped by the user's hands, and the aforementioned throttle lever is rotated with an operator's finger so as to adjust the opening degree of the throttle valve via a throttle cable. The throttle valve is normally biased, as a matter of the usual construction of a carburetor, at the minimum opening degree (idling opening) in which the engine runs at an idling speed. However, since the speed is low, the centrifugal clutch remains disengaged, and the driving power is not transmitted to the working portion, such as clipper blades.

When the throttle valve is rotated to pull the throttle cable over a predetermined length, the play is eliminated and the throttle valve is caused to move from the idling position to a higher speed position. When the rotational speed of a crank shaft of the engine is increased to slightly exceed a predetermined speed, the centrifugal clutch engages and hence the driving power is transmitted to the working portion.

When the throttle lever is released, the throttle valve is caused to return to the idling opening, thereby automatically returning the engine into an idling state, and hence the centrifugal clutch is also disengaged, thus suspending the transmission of driving power to the working portion.

When operator's finger is released from the throttle lever so as to suspend the rotating manipulation of the throttle lever for suspending the work in the conventional portable power working machine, the engine is automatically brought into an idling state and the centrifugal clutch is also brought into a state of cut-off, thus suspending the transmission of driving power to the working portion. However, due to the inertia, the cutting blades of the working portion is still allowed to be actuated for a while.

The movement of the blades of the working portion immediately after the suspension of work may invite unexpected damage or accident. For example, the blades may contact with other matters or a human body at the occasion of carrying the working machine immediately after the work.

In order to overcome these problems, there has been proposed a portable type power working machine wherein a braking means is mounted on the power transmission system between the engine and the working portion (Japanese Patent Publication S/58-54641; U.S. Pat. No. 3,290,871). However the braking means proposed in these references are merely intended to apply a braking to the engine or the working portion when it is required to do so, and are not intended to automatically cut off the power transmission from the engine to the working portion so as to brake the working portion when the engine is shifted to an idling state. Namely, the aforementioned problems cannot be overcome by the braking means proposed in these references.

Furthermore, the braking means proposed in these references are designed such that when the braking is desired to be applied, the brake lever exclusively designed therefor is required to be pulled in the direction to pull a brake band. Namely, the direction of manipulating the brake lever differs from the direction of shifting the engine to an idling state, i.e. the manipulating direction of the throttle lever for moving the throttle valve to the idling opening (generally, the direction of shifting the throttle valve to the idling opening is the direction of releasing the throttle lever). Therefore, the braking means proposed in these references are not suited for solving the aforementioned problems.

SUMMARY OF THE INVENTION

This invention has been made to cope with the aforementioned problems, and therefore an object of the present invention is to provide a braking device for a power working machine, which is capable of immediately suspending the movement of the working portion when an internal combustion engine is shifted to an idling state.

With a view to realizing the aforementioned object, this invention provides a braking device for a power working machine which comprises a transmission shaft, a brake drum fixed to the transmission shaft, and a brake band wound around the brake drum, wherein the brake band is formed of a band which is biased to shrink the diameter thereof, one end of which is pivotally supported on a supporting pin, and the other end of which is formed into an abutment end.

In a preferred embodiment of this invention, the braking device is provided with a band manipulating mechanism, which is provided with an eccentric cam, and an arm link which is integrally formed with the eccentric cam, wherein the eccentric cam is adapted to rotatably engage the abutment end, thereby changing the diameter of said brake band, thus controlling the braking of the brake drum by the brake band. Namely, when the diameter of the brake band is reduced, the brake band is caused to be frictionally engaged with the brake drum, thus braking the brake drum, while when the diameter of the brake band is enlarged, the frictional contact of the brake band with the brake drum is released, thus releasing the braking of the brake drum.

The braking device according to this invention can be applied to a power working machine comprising an internal combustion engine, a centrifugal clutch connected with a crank shaft of the internal combustion engine, and a working portion, wherein the braking device is provided with a transmission shaft connected with a clutch drum of the centrifugal clutch, a brake drum fixed to the transmission shaft, and a brake band wound around the brake drum, wherein the brake band is formed of a band which is biased to shrink the diameter thereof, one end of which is pivotally supported on a supporting pin, and the other end of which is formed into an abutment end.

In a specific application of the braking device according to this invention, the braking device is interconnected with a throttle valve of the engine as well as with a throttle lever, wherein the control of the braking by the braking device and the adjustment of the opening degree of the throttle valve are performed by a rotational manipulation of the throttle lever, while the braking of the brake drum by the brake band is effected when the centrifugal clutch is brought into a state of cut-off.

Since the braking device for a power working machine according to this invention is constructed such that the brake band is employed and the biasing force in the direction to shrink the diameter of the brake band is utilized, the structure of the braking device can be simplified and at the same time the range of the movement of the brake band can be minimized, thus making it possible to simplify the braking device.

Further, since the band manipulation mechanism for manipulating the brake band is constituted by an eccentric cam and an arm link integrally formed with the eccentric cam, and also constructed such that the eccentric cam is pivotally supported with the eccentric outer circumferential surface being adapted to be contacted with the abutment end of the brake band, the structure of the band manipulation mechanism can be simplified.

Furthermore, when this braking device is applied to a power working machine, the working portion is always braked by the braking device when the internal combustion engine is in a suspended or idling state. Therefore, there is little possibility that the working portion is inadvertently actuated when the engine is in a suspended or idling state.

Moreover, when the engine is brought into an idling state upon finishing a work or at the occasion of unexpected situation, the working portion can be immediately braked and suspended, so that any danger due to the movement of the working portion can be avoided.

Further, when the brake band is made of a leaf spring which has been biased to shrink the diameter of the ring-shaped brake band by the effect of elastic restoring force, the brake band can be further simplified.

DETAILED DESCRIPTION OF THE EMBODIMENT

One embodiment of a braking device for a power working machine according to this invention will be explained below with reference to the drawings.

Figure 1:
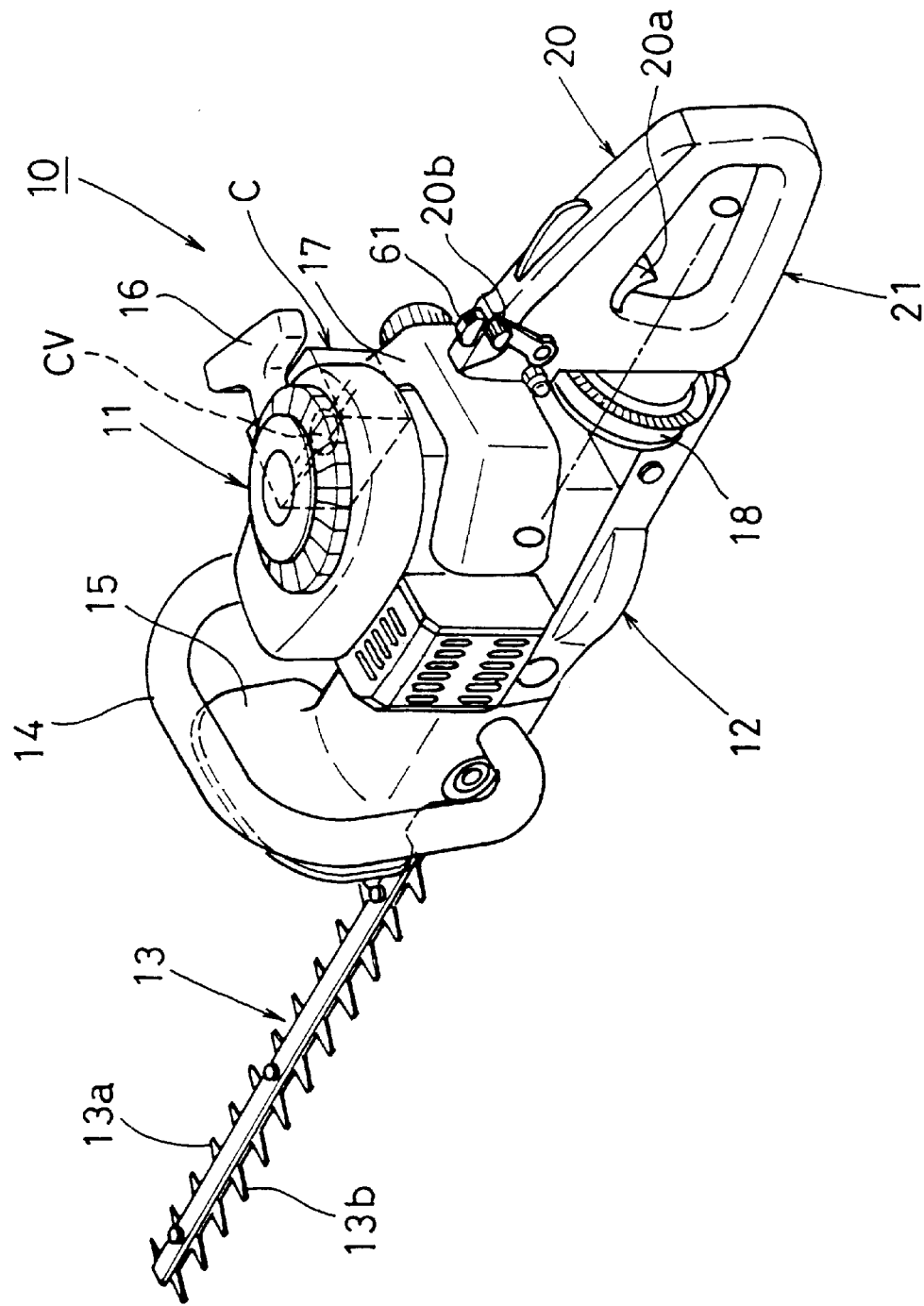
FIG. 1 is a perspective view illustrating a hedge trimmer as a power working machine which is provided with a braking device according to one embodiment of this invention.

FIG. 1 shows a perspective view illustrating one embodiment of a hedge trimmer 10 (representing a power working machine) which is provided with a braking device according to this embodiment. The hedge trimmer 10 comprises an air-cooled two-stroke gasoline internal combustion engine 11, a mount base portion 12 enclosing a transmission case having a power transmission device such as a driving shaft and gears driven by the internal combustion engine 11, a working portion 13 composed of a pair of upper and lower clipper blades 13a and 13b, which are driven by the aforementioned power transmission device by the internal combustion engine 11, a loop-shaped front handle portion 14 mounted on a forward portion of the mount base 12, a hand protector 15 located near the front handle portion 14, and a rear handle portion 20 mounted on a rearward portion of the mount base 12.

A recoil starter 16 and a fuel tank 17 are attached to the internal combustion engine 11. The engine 11 has a carburetor C having a throttle valve CV and a spark plug (not shown). The pair of upper and lower clipper blades 13a and 13b constituting the working portion 13 are designed to be reciprocatingly driven relative to each other by means of the internal combustion engine 11 via the power transmission device, such as a reciprocative motion device which is disposed in the mount base 12. The rear handle portion 20 is mounted on the mount base 12 in such a manner that it is pivotally rotated about an axial line O—O, and that it can be locked at any rotated position. A throttle lever 20a and a sub-throttle lever 20b are attached to the rear handle portion 20.

Figure 2:
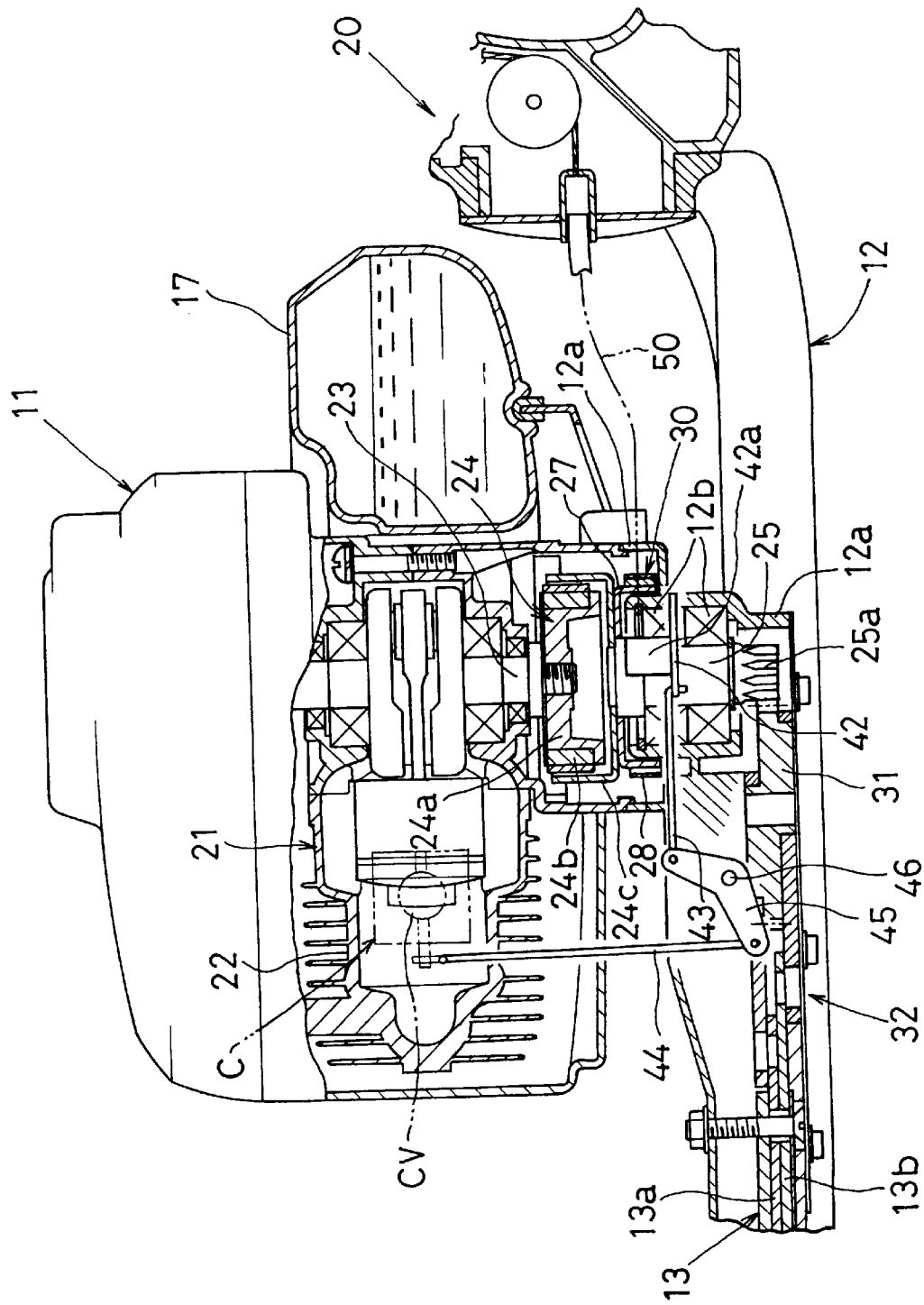
FIG. 2 is a cross-sectional view of a braking device, which is taken along the longitudinal direction of the internal combustion engine and mount base of the hedge trimmer shown in FIG. 1.
Figure 3:
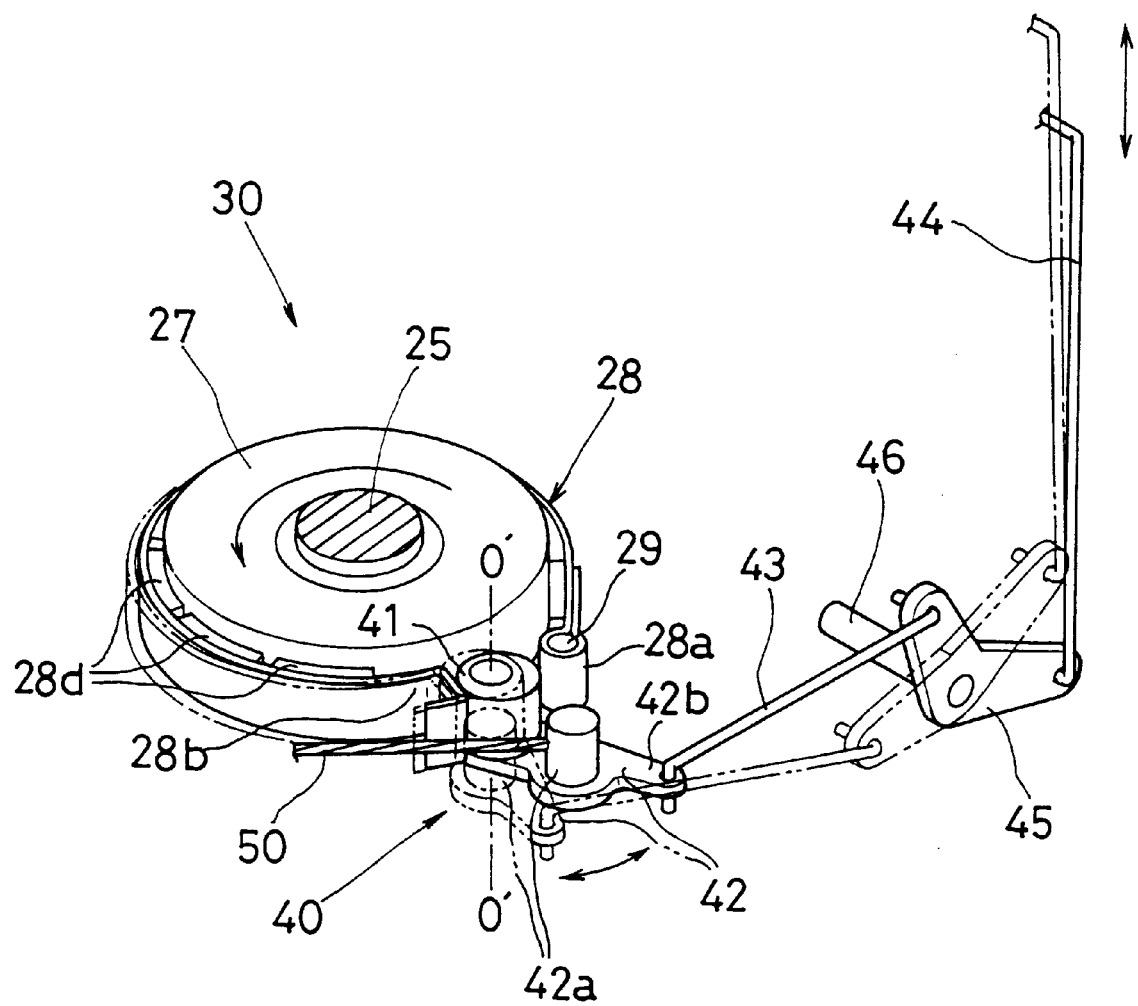
FIG. 3 is a perspective view of the braking device shown in FIG. 2 as it is viewed from the right-rearward direction.
Figure 4:
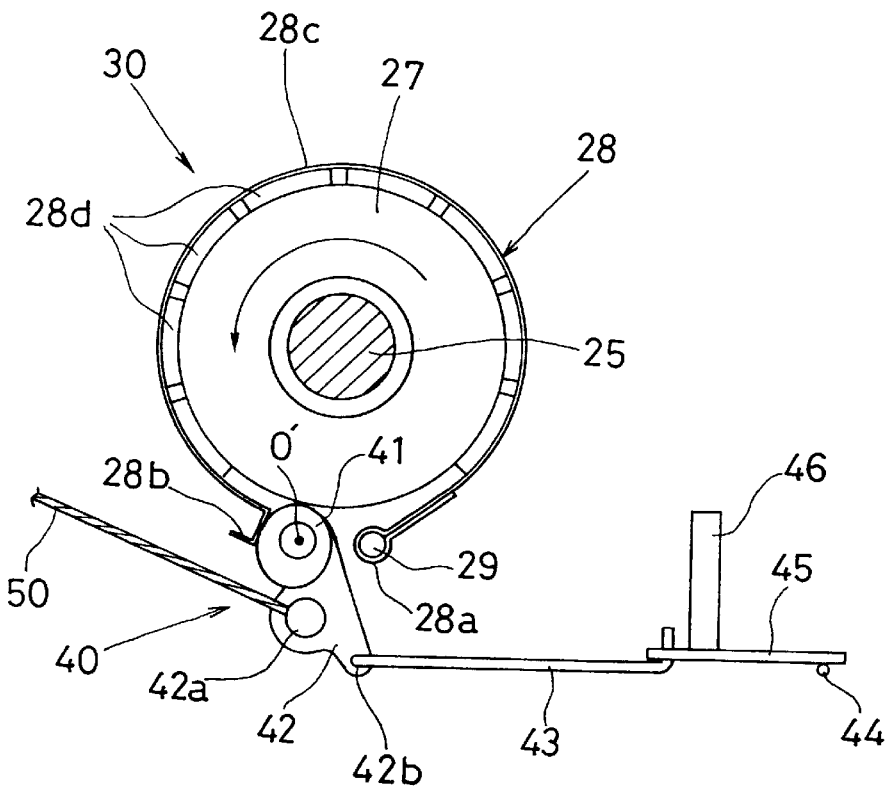
FIG. 4 is a plan of the braking device shown in FIG. 3.

FIG. 2 is a cross-sectional view which is taken along the longitudinal direction of the internal combustion engine 11 and mount base 12 of the hedge trimmer 10 shown in FIG. 1. FIG. 3 is a perspective view of a braking device 30 according to this embodiment for the revolving power transmission mechanism of the hedge trimmer 10 as it is viewed from the right-rearward direction. FIG. 4 is a plan of the braking device 30.

The internal combustion engine 11 is mounted on the transmission case 12a enclosed by the mount base 12 in such a manner that an engine main body 21 is laid down, i.e. a crank shaft 23 thereof is set perpendicular to the mount base 12. A clutch boss 24a of a centrifugal clutch 24 is fixed to the lower end portion of the crank shaft 23 and fitted with clutch shoes 24b which are disposed so as to be movable by centrifugal force in the radial direction. A bottomed cylindrical clutch drum 24c is disposed outside the clutch shoes 24b.

A transmission shaft 25 is integrally attached to the bottom surface of the clutch drum 24c. When the rotational speed of the crank shaft 23 of the engine 11 exceeds a predetermined value, the clutch boss 24a and the clutch shoes 24b are integrally rotated, and at the same time, the clutch shoes 24b begin to shift outward due to centrifugal force, thus causing the clutch shoes 24b to engage the inner circumferential wall of the clutch drum 24c. As a result, the clutch drum 24c is caused to rotate with the clutch shoes 24b, and hence the power output of the internal combustion engine 11 is transmitted via the transmission shaft 25 to the working portion 13.

The transmission shaft 25 is rotatably supported on the bearings 12b and disposed in the transmission case 12a. A small gear wheel 25a formed on the lower end portion of the transmission shaft 25 is engaged with a large gear wheel 31 which is rotatably supported in the transmission case 12a and provided on its both surfaces with eccentric cam disks, whereby the revolving power of the transmission shaft 25 can be transmitted via this large gear wheel 31 to the reciprocating motion mechanism 32 of the clipper blades 13a and 13b.

Figure 5:
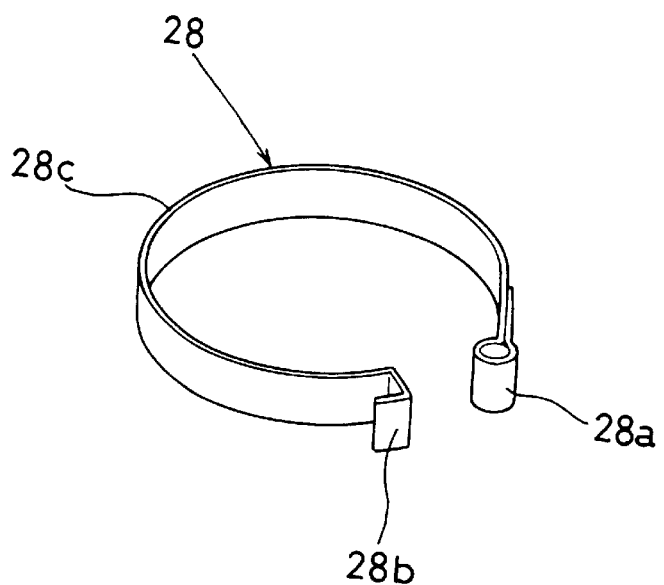
FIG. 5 is a perspective view of a brake band of the braking device shown in FIG. 3.

A cylindrical brake drum 27 of a braking device 30 is integrally attached to the lower portion of the clutch drum 24c, and a brake band 28 is wound around the outer circumferential wall of the brake drum 27 (see FIGS. 3 to 5). The brake band 28 is made of a leaf spring material having a predetermined width, and an intermediate portion 28c thereof is formed into a circular shape which is constrained to a small size (smaller than the diameter of the brake drum 27) due to the resilient force thereof, but is capable of being expanded to a larger diameter conforming to that of the outer circumferential wall of the brake drum 27. One end portion 28a of the brake band 28 is formed into a loop and is pivotally supported on a supporting pin 29 fixed to the transmission case 12a. The other end portion 28b of the brake band 28 is formed into a U-shape as an abutment end and adapted to be contacted with an eccentric cam 41, which is described hereinafter. The inner surface of the intermediate portion 28c of the brake band 28 is provided with a plurality of friction members 28d of suitable length which are equidistantly spaced apart and adhered onto the aforementioned inner surface by means of an adhesive for instance.

As seen from FIG. 3, a band-manipulating mechanism 40 is disposed as a means for manipulating the brake band 28 in the vicinity of both end portions 28a and 28b of the brake band 28. This band-manipulating mechanism 40 is provided with the eccentric cam 41, and also with an arm link 42 which is integrally formed with the eccentric cam 41. This eccentric cam 41 is pivotally supported in the transmission case 12a so as to be rotated about the vertical axis O'—O', and the outer circumferential surface of the eccentric cam 41 is contacted with the U-shape end portion 28b of the brake band 28. The arm link 42 is connected, via a cable-clamping portion 42a which is spaced apart from the vertical axis O'—O', with a throttle cable 50 extending from the throttle lever 20a located on the rear handle portion 20.

First manipulating link 44 for rotating the throttle valve CV extends downwardly from the throttle valve CV of the engine 11, and the lower end portion of the first manipulating link 44 is connected via the V-shaped link 45 and second manipulating-link 43 with the free end 42b of the arm link 42.

When the throttle cable 50 is pulled by manipulating the throttle lever 20a so as to cause the arm link 42 to rotate about the vertical axis O'—O', the eccentric cam 41 is also rotated along with the arm link 42, thus actuating the eccentric outer circumferential surface to push the U-shaped end portion 28b of the brake band 28. Since the brake band 28 is pivotally supported through the one end portion 28a on the supporting pin 29, the pivot position thereof is kept stationary, but the brake band 28 is forced to move in such a manner that the diameter thereof is widened by the force effected by the U-shaped end portion 28b. As a result, the brake band 28 (which has been engaged, via the friction members 28d, with the brake drum 27 so as to prevent the brake drum 27 from being rotated under the condition where the throttle cable 50 is not pulled) is now disengaged from the surface of the brake drum 27 due to the increase in the diameter of the brake band 28, thus releasing the brake.

Further, when the arm link 42 is rotated, the second manipulating link 43 is caused to move, and hence the V-shaped link 45 is caused to rotate about the horizontal supporting shaft 46, and the first manipulating link 44 is moved downward, thus moving in the direction to open the throttle valve CV.

The eccentric cam 41 is designed such that the dimension of the lift thereof is suitably set so that the brake band 28 can be always maintained in the non-braking state when the rotating position thereof is beyond a predetermined position which corresponds to the engine speed at which the centrifugal clutch 24 becomes engaged.

Since the cable 50 is always biased in the direction to close the throttle valve CV by a spring (not shown) disposed in the vicinity of the throttle valve CV, when one's finger is detached from the throttle lever 20a so as to release the pulling of the cable 50, the eccentric cam 41 is rotated in the opposite direction to the aforementioned direction, whereby the force against the U-shaped end portion 28b is weakened, and hence the friction members 28d are again allowed to contact with the brake drum 27 thereby to cause braking of the brake drum 27.

Next, the operation of the aforementioned braking device 30 for the revolving power transmission portion according to this embodiment will be explained.

In operation of the braking device 30 for the revolving power transmission portion of the hedge trimmer 10 of this embodiment, when the internal combustion engine 11 is not running, i.e. the braking device 30 is in a state as indicated by a solid line in FIGS. 2 to 4, the brake band 28 of the braking device 30 is frictionally contacted with the outer circumferential surface of the brake drum 27 due to the spring force thereof to shrink the diameter of the brake band 28, thereby braking the rotation of the brake drum 27, so that the rotation of the brake drum 27 is inhibited, i.e. the clipper blades 13a and 13b which are disposed on a downstream side as compared with the brake drum 27 are prevented from moving reciprocally.

When the recoil starter 16 of the internal combustion engine 11 is manipulated under the above conditions, the internal combustion engine 11 is started. However, since the internal combustion engine 11 is in a state of idling and low in engine speed under these conditions, the centrifugal clutch 24 does not engage, and hence the driving power of the engine 11 cannot be transmitted to the clipper blades 13a and 13b, i.e. the reciprocating motion of the clipper blades 13a and 13b does not take place.

Then, as the throttle lever 20a is rotated with the fingers holding the handle portion 20, the cable 50 is pulled by a predetermined distance so as to actuate the arm link 42 to rotate. As a result, the first manipulating link 44 is pulled via the second manipulating link 43 and the V-shaped link 45, whereby the manipulating system for the throttle valve CV is brought into a tensioned state without a play. Under this condition, the brake band 28 is kept frictionally contacted with the outer circumferential surface of the brake drum 27, and the throttle valve CV is still maintained in the state of the minimum opening (idling opening).

Then, when the throttle lever 20a is rotated, the cable 50 is pulled in the direction to open the throttle valve CV, and hence the throttle valve CV is moved from the minimum opening degree (idling opening) up to the full opening thereby making it possible to adjust the opening degree of the throttle valve CV. As a result, the speed of the engine 11 is increased and the centrifugal clutch 24 is brought into a state of engagement. Meanwhile, the eccentric cam 41 of the band-manipulating mechanism 40 is also caused to rotate so as to engage the bent end 28b of the brake band 28 with the eccentric outer circumferential surface thereof, thus causing the brake band 28 to move in the direction to widen the diameter thereof thereby releasing the braking of the brake drum 27, thus performing the release of braking. As a result of that sequence of manipulations, the power of the engine 11 can be transmitted to the clipper blades 13a and 13b through the centrifugal clutch 24, the transmission shaft 25 and the reciprocating motion mechanism 32, thus allowing the reciprocating motion of the clipper blades 13a and 13b to be effected and making it possible to carry out the cutting work of a hedge.

When it is desired, due to an unexpected situation, to immediately decrease the revolving speed of the internal combustion engine 11 to a great extent (to idling operation) under the condition where the opening degree of the throttle valve CV has been adjusted, the finger holding the throttle lever 20a is released from the throttle lever 20a. Since the arm link 42 and the cable 50 are always biased by the spring (not shown) disposed at the throttle valve CV portion in the direction to close the throttle valve CV, the arm link 42 and the cable 50 are immediately returned to the non-manipulation position concurrently with the returning of the throttle lever 20a to the non-manipulation position, and hence the throttle valve CV is turned again into an idling opening, thus causing the engine 11 to assume an idling state.

When the internal combustion engine 11 is brought into an idling state, the revolving speed thereof is also decreased, so that the centrifugal clutch 24 is disengaged, and hence the power transmission to the working portion 13 is cut off. In this case, even if the power transmission is cut off in this manner, the reciprocating motion of working portion 13, i.e. the clipper blades 13a and 13b, tends to continue due to the inertia of motion. However, due to the elastic restoring force of the brake band 28, the brake band 28 is immediately deformed, contracting the diameter thereof, when the arm link 42 is rotated, concurrently with the movement of the throttle valve CV to the idling opening state. As a result, the friction members 28d of the brake band 28 are engaged with the brake drum 27, whereby the rotation of the brake drum 27 is prevented. Therefore, the reciprocating motion of the clipper blades 13a and 13b can be immediately suspended simultaneously with the transition of the engine 11 to the idling condition thereof.

Furthermore, since this braking device for the revolving power transmission portion according to this embodiment is constructed such that the working portion is always braked by the braking device when the internal combustion engine is in a suspended or idling state, there is little possibility that the working portion 13, i.e. the clipper blades 13a and 13b, are inadvertently actuated when the engine is in a suspended or idling state.

Moreover, when the engine is brought into an idling state upon finishing a task or in an unexpected situation, the revolving power transmission portion on the working portion side can be immediately braked and suspended so as to suspend the reciprocating motion of the working portion 13, i.e. the clipper blades 13a and 13b, so that any danger due to the movement of the working portion 13, e.g. the clipper blades 13a and 13b can be avoided.

Further, since the braking device 30 according to this embodiment makes use of a leaf spring as a brake band, and since the effect of elastic restoring force of the brake band 28 to shrink the diameter thereof (in the direction of clamping) is utilized in this braking device 30, the structure of the braking device 30 can be simplified and at the same time, the moving range of the brake band 28 can be minimized. Furthermore, due to such a construction, this braking device 30 can be easily mounted on the transmission case 12a. Moreover, if this braking device 30 including the clutch drum 24c are disposed on the transmission case 12a, the engine main body 21 can be separated from the transmission case 12a at the portion where the braking device 30 is mounted, the assembling and the maintenance of the braking device 30 can be easily performed.

Since the band-manipulating mechanism 40 for manipulating the brake band 28 according to this embodiment is composed of the eccentric cam 41 and the arm link 42 which is integrally formed with the eccentric cam 41, and since the eccentric cam 41 is pivotally supported in the transmission case 12a so as to be rotated about the vertical axis O'—O', thereby making it possible to contact the outer circumferential surface of the eccentric cam 41 with the U-shape end portion 28b of the brake band 28, the structure of the band-manipulating mechanism 40 can be simplified, and the distance of shifting the brake band 28 can be minimized in relation to the dimention of rotation of the arm link 42. As a result, even if there is a difference in the manipulating movement between the throttle valve CV and the brake band 28, the manipulation of the brake band 28 can be effectively performed simultaneously with the opening manipulation of the throttle valve CV by making use of a single cable 50.

In the foregoing explanation, the present invention has been explained with reference to one embodiment. However, the present invention should not be construed to be limited by this embodiment, but may be variously modified within the spirit of this invention claimed in the appended claims.

For example, the brake band may be a simple band which is formed of a suitable material and biased by a separate spring to shrink diametrically. Further, with a view to further enhance the braking force, an additional biasing spring may be provided in the embodiment shown in the drawings.

As seen from the above explanations, since the braking device according to this invention makes use of a leaf spring as a brake band, and since the effect of elastic restoring force of the brake band to diametrally shrink is utilized in this braking device, the structure of the braking device can be simplified and at the same time, can be easily manipulated.

Moreover, when the engine is brought into an idling state, the revolving power transmission portion on the working portion side can be immediately braked and suspended so as to suspend the motion of the working portion, so that any danger due to the movement of the working portion can be avoided.

What is claimed is:

1. A braking device for a power working machine having a transmission shaft, comprising
   a brake drum fixed to the transmission shaft, and
   a brake band wound around the brake drum,
   the brake band being formed of a band which is biased to shrink the diameter thereof, one end of the brake band being pivotally supported on a supporting pin, and the other end of the brake band being formed into an abutment end.

2. The braking device for power working machine according to claim 1, wherein said braking device is provided with a band-manipulating mechanism comprising an eccentric cam, and an arm link which is integrally formed with the eccentric cam, wherein the eccentric cam is adapted to rotatably contact with said abutment end, thereby upon rotation changing the diameter of said brake band to brake the brake drum by the brake band.

3. The braking device for a power working machine according to claim 2, wherein said brake band is adapted to be shrunk in diameter so as to frictionally contact with said brake drum thereby to brake the brake drum, and also adapted to be enlarged so as to release said frictional contact thereby releasing the braking.

4. The braking device for a power working machine according to claim 1, wherein said brake band is made of a leaf spring which is biased to shrink the diameter thereof by an effect of elastic restoring force thereof.

5. A braking device for a power working machine that includes an internal combustion engine, a centrifugal clutch connected with a crank shaft of the internal combustion engine and having a clutch drum, and a working portion, the braking device comprising a transmission shaft connected with the clutch drum of the centrifugal clutch, a brake drum fixed to the transmission shaft, and a brake band wound around the brake drum, the brake band being formed of a band which is biased to shrink the diameter thereof, one end of which is pivotally supported on a supporting pin, and the other end of which is formed into an abutment end.

6. The braking device for a power working machine according to claim 5, wherein said braking device is provided with a band-manipulating mechanism comprising an eccentric cam, and an arm link which is integrally formed with the eccentric cam, wherein the eccentric cam is adapted to rotatably contact with said abutment end, thereby changing the diameter of said brake band to brake the brake drum by the brake band.

7. The braking device for a power working machine according to claim 6, wherein said arm link is interconnected with a throttle valve of the engine and with a throttle lever of the power working machine, and wherein the control of the braking by the braking device and the adjustment of the opening degree of the throttle valve are performed by manipulation of the throttle lever.

8. The braking device for a power working machine according to claim 5, wherein said brake band is adapted to be shrunk in diameter so as to frictionally contact with said brake drum thereby to brake the brake drum, and also adapted to be enlarged so as to release said frictional contact thereby releasing the braking.

9. The braking device for power working machine according to claim 5, wherein the braking of said brake drum by said brake band is effected when the centrifugal clutch is brought into disengagement.

10. The braking device for a power working machine according to claim 5, wherein said brake band is made of a leaf spring material which is biased to shrink the diameter thereof by an effect of an elastic restoring force thereof.

\* \* \* \* \*